United States Patent [19]
Kusumoto et al.

[11] Patent Number: 6,069,187
[45] Date of Patent: May 30, 2000

[54] RADIATION CURABLE COATING COMPOSITIONS

[75] Inventors: Nubuo Kusumoto, Hiratsuka; Kenji Seko, Yokosuka; Tetsuya Koishihara, Hiratsuka; Atsushi Shioda, Yokohama; Toru Hayase, Hiratsuka, all of Japan

[73] Assignee: Kansai Paint Co., Ltd., Hyogo-Ken, Japan

[21] Appl. No.: 08/956,233

[22] Filed: Oct. 22, 1997

[30] Foreign Application Priority Data

Nov. 14, 1996 [JP] Japan ..................................... 8-302826
Dec. 17, 1996 [JP] Japan ..................................... 8-336185

[51] Int. Cl.$^7$ ....................................................... C08F 2/46
[52] U.S. Cl. .......................... 522/108; 522/107; 522/104; 522/106; 522/168
[58] Field of Search .................................... 522/104, 107, 522/168, 106, 108

[56] References Cited

U.S. PATENT DOCUMENTS 5,674,623  10/1997  Haddon et al. .......................... 428/414

*Primary Examiner*—James J. Seidleck
*Assistant Examiner*—Sanza L. McClendon
*Attorney, Agent, or Firm*—Huntley & Associates

[57] ABSTRACT

A coating composition which comprises (A) an actinic radiation curable resin, which is the ring-opening addition reaction product of (a) a polyester resin having hydroxyl functionality and (b) a compound having both a cyclic ether group and a (meth)acryloyl group, and preferably (B) at least one compound having at least one radical-polymerizable unsaturated group in a molecule. The composition also preferably comprises (C) a photopolymerization initiator and (D) photosensitizer. A process for obtaining the composition and the coating of metal substrates are also disclosed, as well as coated metal substrates that are particularly useful as cans for beverages, soft drinks, juices, and other food products. The coating compositions and the resulting cured coatings and coated substrates exhibit improved processability, adhesivity, hardness, mar resistance, appearance and retort resistance.

4 Claims, No Drawings

6,069,187

RADIATION CURABLE COATING COMPOSITIONS

BACKGROUND OF THE INVENTION

The present invention relates to a resin capable of forming coatings which can be cured with actinic radiation to provide a coating having improved processability, adhesivity, hardness, mar resistance, appearance and retort resistance.

A wide variety of processes have previously been used for obtaining resins and coating compositions. These prior processes, and the resulting coating compositions, have had one or more deficiencies. Some of the prior coating compositions and their preparation processes required cumbersome removal of reactants or reaction products. Others resulted in resin products which exhibit a high viscosity that made application to a substrate difficult. Still others required the use of large quantities of water or coating solvent for application to a substrate, which, in turn, required long curing times.

SUMMARY OF THE INVENTION

The present invention provides coating compositions which can be applied to a substrate without volatile solvents and which can be cured by actinic radiation. The coating compositions, when cured, provide improved properties required in a coating composition for use on metal substrates, particularly those substrates that are subsequently formed into cans for soft drinks, beverages, and food products. These properties include improved processability, adhesivity, hardness, mar resistance, as well as improved appearance and retort resistance.

The present invention provides a process for preparation of an actinic radiation curable resin comprising combining, by ring opening addition reaction, (a) a polyester resin having hydroxyl functionality and (b) a compound having both a cyclic ether group and a (meth)acryloyl group.

In addition, the present invention provides a process for preparation of an actinic radiation curable coating composition comprising combining: (A) an actinic radiation curable resin, which is a ring opening addition reaction product of (a) a polyester resin having hydroxyl functionality and (b) a compound having both a cyclic ether group and a (meth) acryloyl group; and (B) at least one compound having at least one radical polymerizable unsaturated group.

The present invention also provides a coating composition comprising an actinic radiation curable resin, which is a ring-opening addition reaction product of (a) a polyester resin having hydroxyl functionality and (b) a compound having both a cyclic ether group and a (meth)acryloyl group.

In addition, the present invention provides an actinic radiation curable coating composition comprising: (A) an actinic radiation curable resin, which is a ring opening addition reaction product of (a) a polyester resin having hydroxyl functionality and (b) a compound having both a cyclic ether group and a (meth)acryloyl group; and (B) at least one compound having at least one radical polymerizable unsaturated group.

The present invention also provides a process comprising coating a metal substrate with an actinic or ultraviolet radiation curable coating composition of the present invention, as well as providing coated metal substrates that can be formed into cans or other beverage, soft drink, and food containers.

DETAILED DESCRIPTION OF THE INVENTION

The present invention will be more fully understood by reference to the following description and examples. Variations and modifications of the embodiments of the invention can be substituted without departing from the principles of the invention, as will be evident to those skilled in the art.

The process for producing an actinic radiation curable resin of the first embodiment of the present invention comprises reacting a polyester resin having hydroxyl functionality (a) and a compound having both a cyclic ether group and a (meth)acryloyl group in a molecule (b) by a ring-opening addition reaction.

Polyester Resin Having Hydroxyl Functionality (a):

The polyester resin having hydroxyl functionality (a) of the present invention is a polyester resin having at least one hydroxy group at the end and/or side portion of the molecule and is a reaction product between polyhydric alcohols and polybasic acids. The polyester resin having hydroxyl functionality can be obtained by known methods, preferably by an esterification reaction of polyhydric alcohols and polybasic acids. The esterification reaction between polyhydric alcohols and polybasic acids can be conducted by charging polyhydric alcohols and polybasic acids in an amount sufficient to provide a polyester resin having hydroxyl functionality, followed by dehydrative condensation.

Representative polyhydric alcohols which can be used in the process of the present invention, and which can be used to obtain a polyester resin having hydroxyl functionality that can be a component in the coating composition of the present invention include but are not limited to ethylene glycol, diethylene glycol, triethylene glycol, propylene glycol, dipropylene glycol, polyethylene glycol having a molecular weight of less than 4,000, trimethylene glycol, polypropylene glycol having a molecular weight of less than 4,000, tetramethylene glycol, poly(tetramethylene glycol) having a molecular weight of less than 4,000, 1,2-butanediol, 1,3-butanediol, 1,4-butanediol, 1,5-pentanediol, neopentyl glycol, 1,2-hexylene glycol, 1,6-hexanediol, heptanediol, 1,10-heptanediol, cyclohexanediol, 2-butene-1, 4diol, 3-cyclohexene-1,1-dimethanol, 4-methyl-3-cyclohexene-1,1-dimethanol, 3-methylene-1,5-pentanediol, (2-hydroxyethoxy)-1-propanol, 4-(2-hydroxyethoxy)-1-butanol, 5-(2-hydroxyethoxy)-pentanol, 3-(2-hydroxypropoxy)-1-propanol, 4-(2-hydroxypropoxy)-1-butanol, 5-(2-hydroxypropoxy)-1-pentanol, 1-(2-hydroxyethoxy)-2-butanol, 1-(2-hydroxyethoxy)-2-pentanol, hydrogenated bisphenol A, glycerin, polycaprolactone, 1,2,6-hexanetriol, trimethylolpropane, triethylolethane, pentanetriol, tris(hydroxymethyl) aminomethane, 3-(2-hydroxypropoxy)-1,2-propanediol, 6-(2-hydroxyethoxy)-1,2-hexanediol, pentaerythritol, dipentaerythritol, mannitol, and glucose. These polyhydric alcohols can be used singly or in combination.

Preferred among these polyhydric alcohols are ethylene glycol, diethylene glycol, triethylene glycol, propylene glycol, 1,4butanediol, 1,5-pentanediol, neopentyl glycol, 1,6-hexanediol, glycerin, trimethylolpropane and trimethylolethane.

Representative polybasic acids which can be used in the process of the present invention, and which can be used to obtain a polyester resin having hydroxyl functionality include, but are not limited to, phthalic acid, isophthalic acid, terephthalic acid, trimellitic acid, methylcyclohexenetricarboxylic acid, adipic acid, sebacic acid, azelaic acid, hexahydrophthalic acid, succinic acid, dodecenylsuccinic acid, methylglutaric acid, pimelic acid, malonic acid, maleic acid, fumaric acid, chloromaleic acid, dichloromaleic acid, citraconic acid, mesaconic acid, itaconic acid, tetrahydrophthalic acid, carbic acid, het acid, aconic acid, glutaconic acid; acid anhydrides of above-mentioned acids and the like. These polybasic acids can be used singly or in combination.

Preferred among these polybasic acids are phthalic acid, isophthalic acid, terephthalic acid, adipic acid, tetrahydrophthalic acid, hexahydrophthalic acid and succinic acid.

Compound Having Both Cyclic Ether Group and (meth)acryloyl Group(b):

The compound (b) having both a cyclic ether group and a (meth)acryloyl group is added to the above-mentioned polyester resin having hydroxyl functionality (a) to obtain an actinic radiation curable resin of the present invention. Examples of the compound (b) which can be used in the process of the present invention, or which can be used to obtain a polyester resin having hydroxyl functionality that can be a component in the coating composition of the present invention include, but are not limited to, glycidyl (meth)acrylate, methylglycidyl (meth)acrylate; an alicyclic epoxy compound having (meth)acryloyl group which is represented by the following general formulas (1) to (3); an oxetane compound having (meth)acryloyl group which is represented by the following general formula (4); a tetrahydrofurfuryl compound having (meth)acryloyl group which is represented by the following general formula (5):

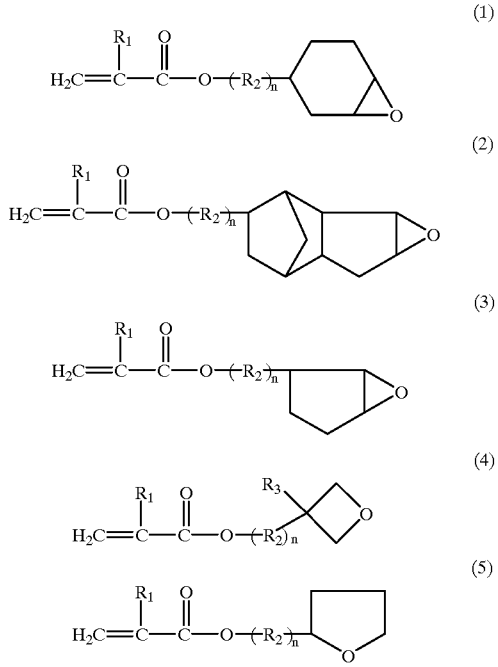

wherein $R_1$ is a hydrogen atom or a methyl group; $R_2$ is a divalent aliphatic saturated hydrocarbon group of 1 to 3 carbon atoms; and n is an integer of 1 to 10.

The compounds (b) having both cyclic ether group and (meth)acryloyl group can be used singly or in combination. Preferred among these compounds is an alicyclic epoxy compound having (meth)acryloyl group which is represented by the above general formulas (1) to (3).

The actinic radiation-curable resin of the present invention can be obtained by reacting the above polyester resin having hydroxyl functionality (a) and the above compound having both a cyclic ether group and a (meth)acryloyl group in a molecule (b), by a ring-opening addition reaction.

Generally, ring-opening addition reactions that can be used according to the present invention can be conducted by using an acid catalyst, preferably in the presence of a radical polymerization initiator, in order to suppress a thermal polymerization, at a temperature of room temperature to 120° C. while blowing air thereinto. When the viscosity of the reaction system is high, the reaction can be conducted in a solvent such as toluene, xylene, methyl ethyl ketone, methyl isobutyl ketone, ethyl acetate or the like. Examples of the acid catalyst can include, for example, Lewis acid catalysts such as boron trifluoride diethyl ether, zinc borofluoride, potassium borofluoride, stannic borofluoride, aluminum chloride, stannic chloride and the like. Examples of the radical polymerization initiator can include, for example, hydroquinone, hydroquinone monomethyl ether, p-benzoquinone and the like.

There is no particular restriction as to the proportion of the polyester resin having hydroxyl functionality (a) and the compound having both a cyclic ether group and a (meth)acryloyl group (b) that can be used according to the present process, and the proportion can be determined dependent upon the specific actinic radiation curable resin or coating composition desired.

The actinic radiation curable resin obtained by the process of the present invention has a number average molecular weight of about from 100 to 20,000, preferably about from 1,000 to 10,000. Particularly preferred is a number average molecular weight of about from 1,000 to 5,000.

The actinic radiation curable resin obtained by the process of the present invention can be cured by actinic radiation, such as that provided by an electron beam, ultraviolet light and the like. When the resin or coating composition is to be cured by ultraviolet light, a photopolymerization initiator should be incorporated into the actinic radiation curable resin prior to curing. Generally, photopolymerization initiators which can be used when curing by ultraviolet light include, but are not limited to, benzoin, benzoin methyl ether, benzoin ethyl ether, benzoin n-propyl ether, benzoin isopropyl ether, benzoin n-butyl ether, alpha-hydroxyisobutylphenone, benzophenone, p-methylbenzophenone, acetophenone, 2-chlorothioxanthone, anthraquinone, 2-methylanthraquinone, phenyl disulfide, 2-nitrofluorene, 2-methyl-1-[4-(methylthio)phenyl]-2-morpholinopropanone-1, 2-benzyl-2-dimethylamino-1-(4-morpholinophenyl)-butanone-1, 2,4,6-trithiophosphile oxide, diethylthioxanthone, and the like. The above photopolymerization initiators may be used alone or in combination, and in amounts of about from 0.1 to 10 parts by weight per 100 parts by weight of the total actinic radiation-curable resin.

For the purpose of promoting the photopolymerization reaction in the presence of the above photopolymerization initiator, a photosensitizer can be used in combination with the photopolymerization initiator. Representative photosensitizers that can be used include, but are not limited to, tertiary amines such as triethylamine, triethanolamine, 2-dimethylaminoethanol and the like; alkylphosphines such as triphenylphosphine and the like; thioether such as beta-thiodiglycol, and the like. The above photosensitizers may be used alone or in combination, in an amount of about from 0.1 to 10 parts by weight per 100 parts by weight of the actinic radiation-curable resin.

Examples of an ultraviolet light source that can be used in the present invention can include, but are not limited to high-pressure mercury lamp, ultra-high pressure mercury lamp, xenon lamp, carbon arc lamp, metal halide lamp, solar light and the like. The irradiation conditions of ultraviolet light are not particularly limited, but preferably are such that a light containing ultraviolet light in the range of 150 to 450 nm may irradiate the composition for at least few seconds under an atmosphere of air or an inert gas. A high-pressure mercury lamp is a preferred source of ultraviolet light and can be used to irradiate the composition under an atmosphere of air.

When cured by electron beam, the above photopolymerization initiator or photosensitizer need not be incorporated into the actinic radiation curable resin or coating composition of the present invention. Sources of electron beams that can be used in the present invention include electron beam accelerators of the Cockcroft type, Cockcroft-Walton type, Van de Graaff type, resonance transformer type, insulated core transformer type, dynamitron type, linear filament type, high frequency type or the like. The irradiation conditions of the electron beam may vary depending on the shape of the substrate to be coated, film thickness, and the like, but generally are such that an irradiation dose is in the range of 1 to 20 Mrad.

The actinic radiation curable resin and coating composition of the present invention is a coating composition which, when irradiated with actinic radiation, preferably in the form of ultraviolet rays, gives rise to radical polymerization and subsequent curing. The present coating composition and the applications thereof are hereinafter described in detail.

Actinic Radiation Curable Resin (A):

The actinic radiation curable resin (A) usable in the present invention is a resin which is a ring opening reaction product of a polyester resin having hydroxyl functionality (a) and a compound having both a cyclic ether group and a (meth)acryloyl group (b).

The actinic radiation curable resin (A) can be used by itself as a coating composition, but is preferably used in combination with compound (B) and optionally with a photopolymerizer (C) and a photosensitizer (D) when the composition will be cured by ultraviolet light. The coating composition can be cured by a broad spectrum of actinic radiation, of which ultraviolet radiation is preferred.

Compounds (B) Having at Least One Radical Polymerizable Unsaturated Group(s):

The compounds (B) that can be used in the present invention comprise at least one polymerizable unsaturated group, which can give rise to polymerization when irradiated with actinic radiation. Examples of the compounds (B) that can be used include, but are not limited to, a monomer having one polymerizable functional group, a monomer having two polymerizable functional groups, a monomer having at least three polymerizable functional groups, a resin having polymerizable unsaturated group(s) and the like.

Examples of monomers having one polymerizable functional group that can be used according to the present invention include, but are not limited to, styrene, methyl (meth)acrylate, ethyl (meth)acrylate, butyl (meth)acrylate, 2-ethylhexyl (meth)acrylate, lauryl (meth)acrylate, cyclohexyl (meth)acrylate, cyclohexenyl (meth)acrylate, 2-hydroxyethyl (meth)acrylate, hydroxypropyl (meth)acrylate, tetrahydrofurfuryl (meth)acrylate, phenoxyethyl (meth)acrylate, phenoxypolyethylene glycol (meth)acrylate, dicyclopentenyl (meth)acrylate, dicyclopentenyloxyethyl (meth)acrylate, isobornyl (meth)acrylate, benzyl (meth) acrylate, epsilon-caprolactone-modified hydroxyethyl (meth)acrylate, polyethylene glycol mono(meth)acrylate polypropylene -hydroxy-3-butoxypropyl (meth)acrylate, phthalic acid monohydroxyethyl (meth)acrylate, ARONIX M110 (a product of Toa-Gousei Chemical Industry Co. Ltd.), N-methylol (meth)acrylamide butyl ether, dimethylaminoethyl (meth)acrylate, N-vinyl-2-pyrrolidone and the like.

Examples of monomers having two polymerizable functional groups that can be used according to the present invention include, but are not limited to, ethylene glycol di(meth)acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, neopentyl glycol di(meth)acrylate, 1,4-butanediol di(meth)acrylate, 1,6-hexanediol di(meth)acrylate, bisphenol A ethylene oxide-modified di(meth)acrylate, 2-hydroxy-1-acryloxy-3-methacryloxypropane, tricyclodecanedimethanol di(meth)acrylate, di(meth)acryloyloxyethylacid phosphate; KAYARAD HX-220, HX-620, R-604 and MANDA (these are products of Nippon Kayaku Co. Ltd.) and the like.

Examples of monomers having at least three polymerizable functional groups that can be used according to the present invention include, but are not limited to, trimethylolpropane tri(meth)acrylate, trimethylolpropane propylene oxide-modified tri(meth)acrylate, glycerin tri(meth)acrylate, glycerin ethylene oxide-modified tri(meth)acrylate, glycerin propylene oxide-modified tri(meth)acrylate, pentaerythritol tri(meth)acrylate, pentaerythritol tetra(meth)acrylate, isocyanuric acid ethylene oxide-modified tri(meth)acrylate, dipentaerythritol hexa(meth)acrylate and the like.

Examples of resins having polymerizable unsaturated group(s) that can be used include, but are not limited to, an unsaturated group-containing polyester resin, an unsaturated group-containing polyurethane resin, an unsaturated group-containing epoxy resin, an unsaturated group-containing phosphoepoxy resin, an unsaturated group-containing acrylic resin, an unsaturated group-containing silicone resin, an unsaturated group-containing melamine resin and the like.

These compounds having radical polymerizable unsaturated groups can be used singly or in combination.

Photopolymerization Initiator (C):

The photopolymerization initiator (C) of the present invention is preferably a conventional that can be activated by actinic radiation such as that provided by ultraviolet light, and when activated, will generate radicals. Representative examples of photopolymerization initiators that can be used according to the present invention include, but are not limited to, benzoin, benzoin methyl ether, benzoin ethyl ether, benzoin n-propyl ether, benzoin isopropyl ether, benzoin n-butyl ether, diethoxyacetophenone, 2-hydroxy-2-methyl-1-phenylpropane-1-one, benzyl dimethyl ketal, 1-hydroxycyclohexylphenyl ketone, 2-methyl-2-morpholino-(4-thiomethylphenyl) propane-1-one, 2-benzyl-2-dimethylamino-1-(4 morpholinophenyl) butanone, 2,4,6-trimethylbenzoyldiphenylphosphine oxide, benzophenone, o-benzoylbenzoic acid methyl ether, hydroxybenzophenone, 2-isopropylthioxanthone, 2,4-dimethylthioxanthone, 2,4-dichlorothioxanthone, 2,4,6-tris (trichloromethyl)-S-triazine, 2-methyl-4,6-bis(trichloro)-S-triazine, 2-(4methoxyphenyl)-4,6-bis(trichloromethyl)-S-triazine, and the like. The above photopolymerization initiators can be used alone or in combination.

Photosensitizer (D):

For the purpose of promoting the photopolymerization reaction in the presence of the above photopolymerization initiator, a photosensitizer can be used in combination with the photopolymerization initiator. Representative examples of photosensitizers that can be used may include tertiary amines such as triethylamine, triethanolamine, methyldiethanolamine, 4-dimethylaminobenzoic acid methyl ester, 4-dimethylaminobenzoic acid isoamyl ester, benzoic acid (2-dimethylamino) ethyl ester, Michler's ketone, 4,4'-diethylaminobenzophenone and the like; alkylphosphines such as triphenylphosphine and the like; thioether such as beta-thiodiglycol, and the like. The above photosensitizers can be used alone or in combination, preferably in an amount of about from 0.1 to 10 parts by weight per 100 parts by weight of the total of the resin (A) and the compound (B).

The proportion of the resin (A) and the compound having at least one radical polymerizable unsaturated group in a molecule (3) that can be used according to the present invention vary widely. Specifically, the proportion of the resin (A) can be about from 5 to 95 parts by weight (solid content), preferably 20 to 80 parts by weight. The proportion of the compound (B) can be about from 5 to 95 parts by weight (solid content), preferably 20 to 80 parts by weight. In the above proportions, the total of the resin (A) and the compound (B) should be about 100 parts by weight. If the proportion of the resin (A) to the compound (B) is lower than about 5 parts by weight, it results in a poor velocity of the curing reaction and in a coating film inferior in appearance, retort resistance and mar resistance. Compositions having such proportions higher than about 95 parts by weight of the resin (A) to the compound (B) similarly result in a poor velocity of the curing reaction and in a coating film inferior in appearance, retort resistance, hardness and mar resistance. If the proportion of the compound (B) to the resin (A) is lower than 5 parts by weight, it results in a poor velocity of the curing reaction and in a coating film inferior in appearance, retort resistance and mar resistance, while the proportion higher than 95 parts by weight of the compound (B) to the resin (A) results in a poor velocity of the curing reaction and in a coating film inferior in appearance, retort resistance, hardness and mar resistance.

The amount of the photopolymerization initiator (C) that can be used is generally about from 0.1 to 10 parts by weight, preferably 1 to 8 parts by weight, per 100 parts by weight of the total of the resin (A) and the compound (B). If the amount of the photopolymerization initiator (C) is less than about 0.1 parts by weight, it causes a poor generation of radicals and the composition will possess poor curability, while an amount of more than about 10 parts by weight results in a coated film having poor transmission of light and a subsequent cured film inferior in uniform curability.

The coating composition of the present invention can further comprise a photosensitizer (D), a lubricity imparting agent, a pigment (e.g. coloring pigment or extender pigment) or a dye, of such an amount that curing is not significantly hindered; a modifying resin (e.g. polyol resin, acrylic resin, polyester resin, polyolefin resin, epoxy resin, polybutadiene resin); and so forth. The need for such additional components will be apparent to those skilled in the art and will depend upon the specific application and the intended final product, as well as any process considerations.

The above lubricity imparting agents can be used to improve lubricity of a coating film formed. These agents can include, for example, waxes such as fatty acid ester wax (which is an ester of a polyol compound(s) and a fatty acid(s)), silicon based wax, fluorine containing wax, lanolin wax, carnauba wax and the like. The lubricity imparting agents can be used singly or in combination of two or more kinds, in an amount of generally 10 parts by weight or less per 100 parts by weight of the total of the ultraviolet curable resin (A) and the compound having at least one radical-polymerizable unsaturated group in a molecule (B). Among the above lubricity imparting agents, the silicon-based wax can impart excellent lubricity after film curing but before retort treatment; and the fatty acid ester wax can impart excellent lubricity after film curing and retort treatment. Therefore, it is preferable to use at least one wax selected from the silicon-based wax and the fatty acid ester wax. Combined use of 0.01 to 5 parts by weight of the silicon-based wax and 0.01 to 5 parts by weight of the fatty acid ester wax per 100 parts by weight of the resin (A) and the compound (B) can provide a coating film having excellent lubricity before and after retort treatment.

The actinic radiation curable coating compositions according to the present invention can form a cured film by being applied to a metal substrate, a resin film laminated metal substrate, or a metal can formed by molding of any of these metal substrates, and then being irradiated, preferably with ultraviolet rays. Metal substrates which can be used include, but are not limited to, plates of tinplate, aluminum, tin-free steel, iron, zinc, zinc-plated steel, steel plated with a zinc-other metal alloy, and other metals that can be molded into a metal can. These metal substrates can be subjected to a chemical treatment such as zinc phosphate treatment or chromate treatment. Representative resin film laminated metal substrates which can be used include those obtained by laminating a metal substrate with a film of a resin such as polyester resin (e.g. polyethylene terephthalate), polyolefin resin (e.g. polyethylene or polypropylene), polyamide resin, epoxy resin, polyvinyl chloride or the like. The thickness of the present coating composition applied can be appropriately determined depending upon the application but can be in the range of generally about 2 to 20 micrometers, preferably about 2 to 8 micrometers in terms of "as dried" film thickness.

The actinic radiation curable coating composition according to the present invention can be applied to the appropriate substrate by a coating method such as roll coating, spray coating, bar coating, roller coating, silk screen printing or the like.

A wide variety of actinic radiation can be used to cure the present coating compositions and resins. Particularly when the coating compositions comprise one or both of photopolymerization initiator (C) and photosensitizer (D), the coating compositions can be cured by ultraviolet (UV) radiation. In this case, the UV sources which can be used include, for example, a high pressure mercury lamp, an ultrahigh pressure mercury lamp, a xenon lamp, a carbon arc, a metal halide lamp and a sunlight. The appropriate UV amount applied is generally 10 to 1,000 mj/cm$^2$.

The actinic radiation curable resin and compositions obtained by the process of the present invention possesses the aforementioned characteristics and advantages, and is suitable as a coating composition, an ink for printing, an adhesive agent, a resist, a molding material and the like. Furthermore, the resins and coating compositions of the present invention comprise an actinic radiation curable resin (A) and the compound having radical polymerizable unsaturated group(s) (B) as film forming components that can be effectively cured, in preferred embodiments having a photopolymerization initiator (C), by the use of ultraviolet rays. The resulting coating films are superior in processability, adhesivity, hardness, mar resistance and so on even in a thin film state and moreover in film appearance and retort resistance (these film properties are necessary for coatings for cans). Therefore, the present coating composition is particularly suitable for use as a coating for the outer surface of a can.

EXAMPLES

The present invention will be explained more specifically in the following Examples and Comparative Examples, in which parts and percentages are all by weight.

Production Example I

In a reactor were charged 666 parts of phthalic anhydride, 747 parts of isophthalic acid and 520 parts of neopentyl glycol. The reactor contents were heated to 160° C. in about one hour while distillating water, followed by heating to 220° C. in 3 hours while distillating water and then keeping for one hour at 220° C. Then, a small amount of xylene was added and the acid value of the reaction mixture was measured on occasion while distillating water under the azeotropic temperature. When the acid value of the reaction mixture became less than 1.0, the reaction was stopped to obtain a polyester resin having hydroxyl functionality (a-1) having a solid content of 100%, a number-average molecular weight of about 2,000 as measured by gel permeation chromatography and a hydroxyl value of 56 mgKOH/g.

Production Example 2

In a reactor were charged 764 parts of isophthalic acid, 764 parts of terephthalic acid, 310 parts of ethylene glycol, 590 parts of 1,6-hexanediol and 2 parts of dibutyltin oxide. The reactor contents were heated to 160° C. in about one hour while distillating water, followed by heating to 220° C. in 3 hours while distillating water and then keeping for one hour at 220° C. Then, a small amount of xylene was added and the acid value of the reaction mixture was measured on occasion while distillating water under the azeotropic temperature. When the acid value of the reaction mixture became less than 1.0, the reaction was stopped to obtain a polyester resin having hydroxyl functionality (a-2) having a solid content of 100%, a number-average molecular weight of about 2,600 as measured by gel permeation chromatography and a hydroxyl value of 43 mgKOH/g.

Example 1

In a flask were charged 1,000 parts of the polyester resin having hydroxyl functionality (a-1) obtained in Production Example 1, 182 parts of 3,4-epoxycyclohexylmethyl acrylate, 5 parts of boron trifluoride diethyl ether, 1 part of hydroquinone monomethyl ether and 507 parts of toluene. The flask contents were heated to 80° C., followed by keeping at 80° C. for 8 hours while blowing air thereinto to obtain an acryloyl group-containing polyester resin solution (A-1) having a solid content of 70%. The resin obtained had a number-average molecular weight of about 2,400, as measured by gel permeation chromatography, and contained about 2.04 of the acryloyl group in a molecule on the average.

Example 2

In a flask were charged 1,000 parts of the polyester resin having hydroxyl functionality (a-1) obtained in Production Example 1, 364 parts of 3,4-epoxycyclohexylmethyl acrylate, 10 parts of boron trifluoride diethyl ether, 1 part of hydroquinone monomethyl ether and 585 parts of toluene. The flask contents were heated to 80° C., followed by keeping at 80° C. for 10 hours while blowing air thereinto to obtain an acryloyl group-containing polyester resin solution (A-2) having a solid content of 70%. The resin obtained had a number-average molecular weight of about 2,700, as measured by gel permeation chromatography, and contained about 3.92 of the acryloyl group in a molecule on the average.

Example 3

In a flask were charged 1,000 parts of the polyester resin having hydroxyl functionality (a-1) obtained in Production Example 1, 170 parts of 3-acryloxymethyl-3-ethyloxetane, 10 parts of boron trifluoride diethyl ether, 1 part of hydroquinone monomethyl ether and 490 parts of toluene. The flask contents were heated to 80° C., followed by keeping at 80° C. for 10 hours while blowing air thereinto to obtain an acryloyl group-containing polyester resin solution (A-3) having a solid content of 70%. The resin obtained had a number-average molecular weight of about 2,350, as measured by gel permeation chromatography, and contained about 2.00 of the acryloyl group in a molecule on the average.

Example 4

In a flask were charged 1,000 parts of the polyester resin having hydroxyl functionality (a-1) obtained in Production Example 1, 142 parts of glycidyl methacrylate, 10 parts of boron trifluoride diethyl ether, 1 part of hydroquinone monomethyl ether and 479 parts of toluene. The flask contents were heated to 80° C., followed by keeping at 80° C. for 10 hours while blowing air thereinto to obtain a methacryloyl group-containing polyester resin solution (A-4) having a solid content of 70%. The resin obtained had a number-average molecular weight of about 2,300, as measured by gel permeation chromatography, and contained about 2.00 of the methacryloyl group in a molecule on the average.

Example 5

In a flask were charged 1,300 parts of the polyester resin having hydroxyl functionality (a-2) obtained in Production Example 2, 273 parts of 3,4-epoxycyclohexylmethyl acrylate, 10 parts of boron trifluoride diethyl ether, 1 part of hydroquinone monomethyl ether and 674 parts of toluene. The flask contents were heated to 80° C., followed by keeping at 80° C. for 10 hours while blowing air thereinto to obtain an acryloyl group-containing polyester resin solution (A-5) having a solid content of 70%. The resin obtained had a number-average molecular weight of about 3,150, as measured by gel permeation chromatography, and contained about 2.99 of the acryloyl group in a molecule on the average.

Example 6

In a flask were charged 1,300 parts of the polyester resin having hydroxyl functionality (a-2) obtained in Production Example 2, 156 parts of tetrahydrofurfuryl acrylate, 10 parts of boron trifluoride diethyl ether, 1 part of hydroquinone monomethyl ether and 624 parts of toluene. The flask contents were heated to 80° C., followed by keeping at 80° C. for 10 hours while blowing air thereinto to obtain an acryloyl group-containing polyester resin solution (A-6) having a solid content of 70%. The resin obtained had a number-average molecular weight of about 2,900, as measured by gel permeation chromatography, and contained about 2.00 of the acryloyl group in a molecule on the average.

Application Example 1

The acryloyl group-containing polyester resin solution (A-1) obtained in Example 1 was coated onto a mild steel sheet treated with zinc phosphate to a dry film thickness of 10 micrometers by use of a roll coater, followed by drying at a temperature of 80° C. for 10 minutes. Then, the dried film was cured by irradiation of electron beam in an irradiation dose of 2 Mrad to obtain a glossy cured film having excellent adhesive property.

Application Example 2

A mixture of 143 parts of the acryloyl group-containing polyester resin solution (A-2) obtained in Example 2 and 3 parts of benzyl dimethyl ketal was coated onto a polyester film sheet to a dry film thickness of 5 micrometers by use of a roll coater, followed by drying at a temperature of 60° C. for 10 minutes. Then, the dried film was irradiated with an ultraviolet light emitted from a high-pressure mercury lamp (120 W/cm) in a dose of 200 mj/cm$^2$ to obtain a glossy cured film having excellent adhesive property.

Application Example 3

The acryloyl group-containing polyester resin solution (A-3) obtained in Example 3 was coated onto a slate sheet to a dry film thickness of 30 micrometers by use of a spray gun, followed by drying at a temperature of 80° C. for 10 minutes. Then, the dried film was cured by irradiation of electron beam in a irradiation dose of 3 Mrad to obtain a cured film having excellent adhesive property and excellent weatherability.

Application Example 4

The methacryloyl group-containing polyester resin solution (A-4) obtained in Example 4 was coated onto a polypropylene sheet having a film thickness of 50 micrometers to a dry film thickness of 5 micrometers by use of a bar coater, followed by drying at a temperature of 60° C. for 10 minutes and by laminating an aluminum foil of 50 micrometers thereon. Then, the dried laminated sheet was cured by irradiation of electron beam in an irradiation dose of 3 Mrad to obtain a cured laminated sheet having excellent adhesive property.

Application Example 5

A mixture of 143 parts of the acryloyl group-containing polyester resin solution (A-5) obtained in Example 5 and 5 parts of "Lucirin TPO" (a photopolymerization initiator marketed by BASF Co. Ltd., 2,4,6-trimethylbenzoyldiphenylphosphine oxide) was coated onto a glass plate to a dry film thickness of 15 micrometers by use of a bar coater, followed by drying at a temperature of 80° C. for 10 minutes. Then, the dried film was irradiated with an ultraviolet light emitted from a high-pressure mercury lamp (120 W/cm) in a dose of 200 mj/cm$^2$ to obtain a glossy cured film having excellent adhesive property.

Application Example 6

A mixture of 143 parts of the acryloyl group-containing polyester resin solution (A-6) obtained in Example 6 and 5 parts of "Irgacure 907" (a photopolymerization initiator marketed by Ciba-Geigy Co. Ltd.) was coated onto a poly (vinyl chloride) sheet to a dry film thickness of 20 micrometers by use of a bar coater, followed by drying at a temperature of 60° C. for 10 minutes. Then, the dried film was irradiated with an ultraviolet light emitted from a high-pressure mercury lamp (120 W/cm) in a dose of 200 mj/cm$^2$ to obtain a glossy cured film having excellent adhesive property.

Production of Ultraviolet-curable Coating Composition for Cans

Example 7

In a four-necked flask were charged 1,428 parts of the acryloyl group-containing polyester resin solution (A-1) obtained in Example 1, 600 parts of phenoxydiethyleneglycol acrylate, 300 parts of tripropyleneglycol diacrylate and 100 parts of trimethylolpropane triacrylate. The flask contents were heated to 80° C. while blowing air thereinto, followed by removing toluene in the flask by means of a vacuum pump, and cooling to obtain a mixture of monomers.

There were mixed 2,000 parts of the above mixture of monomers, 100 parts of benzyl dimethyl ketal and 10 parts of a fatty acid ester wax obtained by reacting 1 mole of decaglycerine ether (which is a polyglycerine having a polymerization degree of 10 and which has 12 hydroxyl groups in the molecule) and 10 moles of lauric acid. The mixture was stirred at 50° C. for 20 minutes and cooled to room temperature to obtain an ultraviolet-curable coating composition for cans.

Examples 8 to 14 and Comparative Examples 1 to 2

Operations were conducted in the same manner as in Example 7 except that the components shown in Table 1 were used in the proportions shown in Table 1, whereby various ultraviolet-curable coating compositions were obtained.

In Table 1,

*1 Unsaturated epoxy resin: an unsaturated epoxy resin having an acid value of less than 1 obtained by charging in a flask 390 parts of Epon#828 (a bisphenol-A type epoxy resin, a product of Shell Chemical Co. Ltd.), 144 parts of acrylic acid, 2 parts of hydroquinone monomethyl ether and 20 parts of triethylamine, heating the flask contents to 110° C. while blowing air thereinto, keeping at 110° C. for 5 hours, and cooling.

*2 Lucirin TPO: a product of BASF Co. Ltd., 2,4,6-trimethylbenzoyldiphenylphosphine oxide.

Preparation of Coated Plates for Testing

Each of the coating compositions obtained in Examples 7 to 14 and Comparative Examples 1 to 2 was coated on a tin-free steel plate (TFS) of 0.20 mm in thickness and a PET steel plate obtained by heat- and pressure-laminating a homo PET (homo polyethylene terephthalate) sheet of 12 micrometers in thickness on the above TFS, so as to give a coating film thickness (as dried) of 5 micrometers. Each of the coating compositions was irradiated with ultraviolet rays by the use of a high pressure mercury lamp (160 W/cm) from a distance of 15 cm so that the UV amount applied became 150 mJ/cm$^2$, whereby each coated composition was cured to obtain each coated plate for testing.

Each coated plate for testing was tested by the following test method. Incidentally, all the tests were conducted at 20° C. Test results are shown in Table 2.

Test Methods

Pencil hardness: Pencil scratching was conducted on the film of a coated plate for testing, according to JIS K 5400 8.4.2(1990). Evaluation was made by the breakage method.

Impact resistance (DuPont method): Impact molding was applied to the uncoated side of a coated plate for testing, by the use of a DuPont impact tester under the conditions of diameter of impact point=⅜ in., falling weight=500 g and falling height=50 cm. The molded portion was observed by the use of a microscope and evaluated according to the following yardstick.

a: Neither cracking nor film peeling is seen.

b: Slight cracking is seen but no film peeling is seen.

c: Considerable cracking is seen but no film peeling is seen.

d: Film peeling is seen.

Mar resistance: A friction test was conducted for a coated plate for testing, by the use of a Bauden friction tester (a stick-slip tester of Soda type, a product of Shin-Ko Engineering Co. Ltd.) under the conditions of friction portion diameter=3/16 in. steel ball, load=1 kg and frictional speed=7 reciprocations/min. Times of friction required for the first appearance of mar on the coating film of the test plate was measured. When no mar appeared in 50 times, mar resistance was expressed as >50.

Adhesivity: 100 squares of 1.5 mm×1.5 mm were formed on the coated side of a coated plate for testing, in accordance with JIS K 5400 8.5.2(1990) (cross-cutting and taping method). On these squares was adhered a pressure-sensitive adhesive tape; the tape was peeled quickly; and the condition of the squares was evaluated according to the following yardstick.

a: No film peeling is seen.
    b: Film was removed slightly at the square periphery.
    c: Film was removed slightly at the square periphery and other place(s).
    d: Considerable film peeling is seen.

20° gloss: The 20° specular reflectivity of a coated plate for testing was measured.

In-retort extraction: A coated plate for testing was immersed in deionized water and heat-treated at 125° C. for 30 minutes in an autoclave. Then, reduction (%) in film weight of test plate was measured.

Film appearance: The appearance of the coating film formed on the PET steel plate was evaluated visually according to the following yardstick.

a: There is no reduction in luster.
    b: There is slight reduction in luster.
    c: There is considerable reduction in luster.

TABLE 1

| | Examples | | | | | | | | Comparative Examples | |
|---|---|---|---|---|---|---|---|---|---|---|
| | 7 | 8 | 9 | 10 | 11 | 12 | 13 | 14 | 1 | 2 |
| Resin (A) | | | | | | | | | | |
| (A-1) obtained in Example 1 | 1428 | 1428 | | | | 714 | | | | 1428 |
| (A-2) obtained in Example 2 | | | 1428 | | | | | | | |
| (A-3) obtained in Example 3 | | | | 1428 | | | | | | |
| (A-4) obtained in Example 4 | | | | | 1428 | 714 | | | | |
| (A-5) obtained in Example 5 | | | | | | | 1428 | | | |
| (A-6) obtained in Example 6 | | | | | | | | 1428 | | |
| Compound (B) | | | | | | | | | | |
| Phenoxydiethyleneglycol acrylate | 600 | 600 | 800 | 600 | 600 | 600 | 400 | 600 | 600 | 30 |
| 2-Hydroxy-3-phenoxypropylacrylate | | | | | 200 | 200 | 400 | | | |
| Tripropyleneglycol diacrylate | 300 | 300 | 200 | 300 | | 200 | 200 | 300 | 300 | |
| Trimethylolpropane triacrylate | 100 | 100 | | 100 | | | | 100 | 100 | |
| Unsaturated epoxy resin (*1) | | | | | 200 | | | | | 1000 |
| Photopolymerization Initiator (C) | | | | | | | | | | |
| Benzyl dimethyl ketal | 100 | 50 | 100 | 100 | 50 | 50 | 100 | 100 | 100 | 50 |
| Lucirin TPO (*2) | | 50 | | | 50 | 50 | | | | |
| Other Additive | | | | | | | | | | |
| Fatty acid ester wax | 10 | 10 | 10 | 10 | 10 | 10 | 10 | 10 | 10 | 5 |
| Titanium dioxide | | 1000 | | | | 1000 | | | | |

TABLE 2

| Substrate | | Examples | | | | | | | | Comparative Examples | |
|---|---|---|---|---|---|---|---|---|---|---|---|
| | | 7 | 8 | 9 | 10 | 11 | 12 | 13 | 14 | 1 | 2 |
| TFS | Pencil hardness | 4H | 4H | 3H | 4H | 4H | 3H | 3H | 4H | 4H | 2B |
| | Impact resistance | b | a | a | b | a | a | a | b | c | b |
| | Mar resistance | >50 | >50 | >50 | >50 | >50 | >50 | >50 | >50 | >50 | 10 |
| | Adhesivity | b | b | b | b | b | a | b | b | b | b |
| | 20° gloss | 110 | 103 | 105 | 110 | 100 | 100 | 102 | 108 | 100 | 103 |
| | In-retort extraction | 2.1 | 2.8 | 3.0 | 2.2 | 2.7 | 3.2 | 3.0 | 2.1 | 8.5 | 9.1 |
| PET steel | Pencil hardness | 3H | 3H | 2H | 3H | 3H | 2H | 2H | 4H | 5H | 3B |
| | Impact resistance | a | a | a | b | a | a | a | b | d | b |
| | Mar resistance | >50 | >50 | >50 | >50 | >50 | >50 | >50 | >50 | >50 | 8 |
| | Adhesivity | b | a | b | b | b | b | b | b | d | b |
| | 20° gloss | 90 | ta 88 | 84 | 90 | 84 | 84 | 86 | 90 | 82 | 84 |
| | In-retort extraction | 2.4 | 3.0 | 3.2 | 2.6 | 3.0 | 3.4 | 3.2 | 2.5 | 9.2 | 9.0 |
| | Film appearance | a | a | a | a | a | a | a | a | b | c |

We claim:

1. A liquid coating composition comprising an actinic radiation curable resin, which is a ring-opening addition reaction of (a) a polyester resin having hydroxl functionality and (b) an alicyclic epoxy compound having a (meth)acryloyl group selected from at least one of the group comprising compounds represented by the following general formulas (1) to (3):

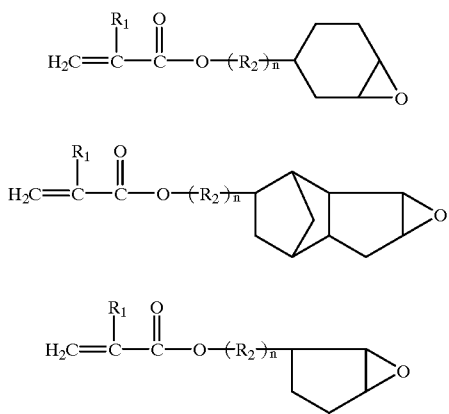

wherein $R_1$ is a hydrogen atom or a methyl group; $R_2$ is a divalent aliphatic saturated hydrocarbon group of 1 to 3 carbon atoms; and n is an integer of 1 to 10.

2. A coating composition comprising:
(A) an actinic radiation curable resin, which is a ring opening addition reaction product of (a) a polyester resin having hydroxyl functionality and (b) an alicyclic epoxy compound having at least one (meth)acryloyl group; and
(B) at least one compound having at least one radical polymerizable unsaturated group.

3. A composition of claim 2 wherein the alicyclic epoxy compound having (meth)acryloyl group is selected from at least one of the group comprising compounds represented by the following general formulas (1) to (3):

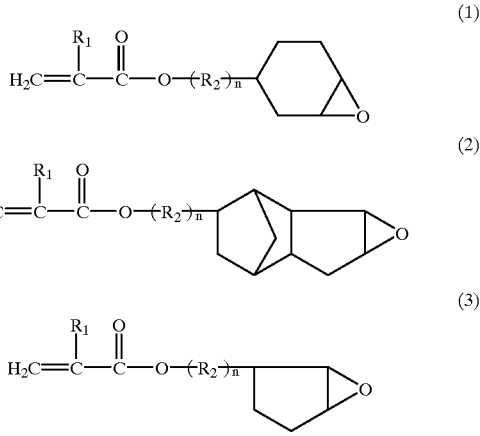

wherein $R_1$ is a hydrogen atom or a methyl group; $R_2$ is a divalent aliphatic saturated hydrocarbon group of 1 to 3 carbon atoms; and n is an integer of 1 to 10.

4. A coating composition comprising an actinic radiation curable resin, which is a ring opening addition reaction product of (a) a polyester resin having hydroxyl functionality and (b) an alicyclic epoxy compound having at least one (meth)acryloyl group.

* * * * *